June 26, 1934. W. W. WOOD ET AL 1,964,446
COMBINATION PHONOGRAPH AND PICTURE PROJECTOR
Filed Nov. 19, 1932   3 Sheets-Sheet 2
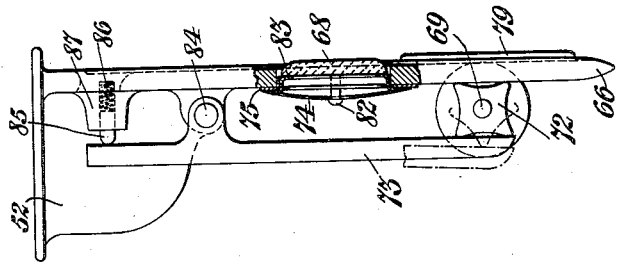
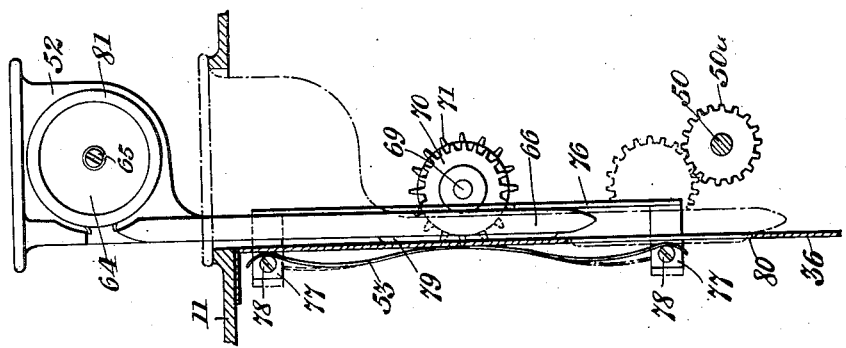
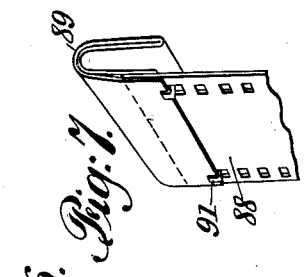
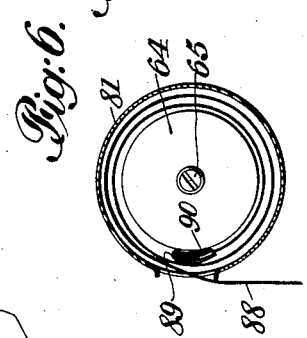
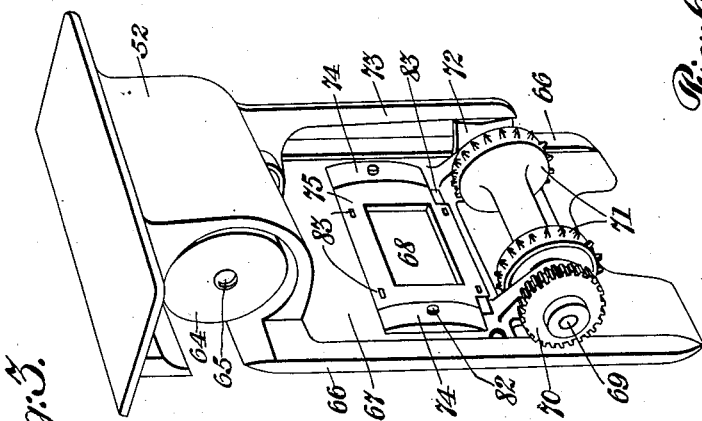
INVENTORS
William W. Wood.
Frederick W. Lutz.
BY
ATTORNEY June 26, 1934.  W. W. WOOD ET AL  1,964,446
COMBINATION PHONOGRAPH AND PICTURE PROJECTOR
Filed Nov. 19, 1932  3 Sheets-Sheet 3
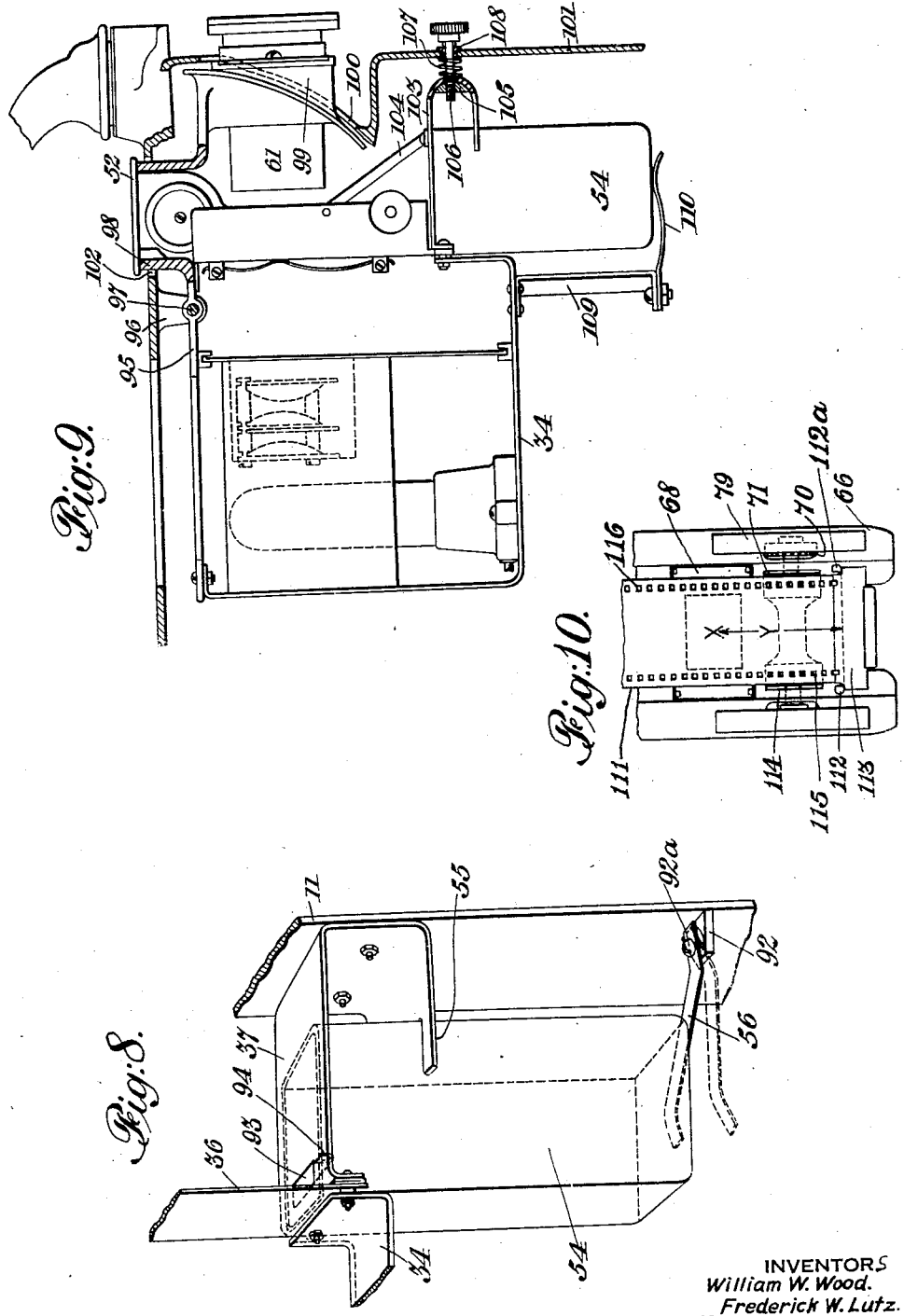
INVENTORS
William W. Wood.
Frederick W. Lutz.
BY
ATTORNEY Patented June 26, 1934

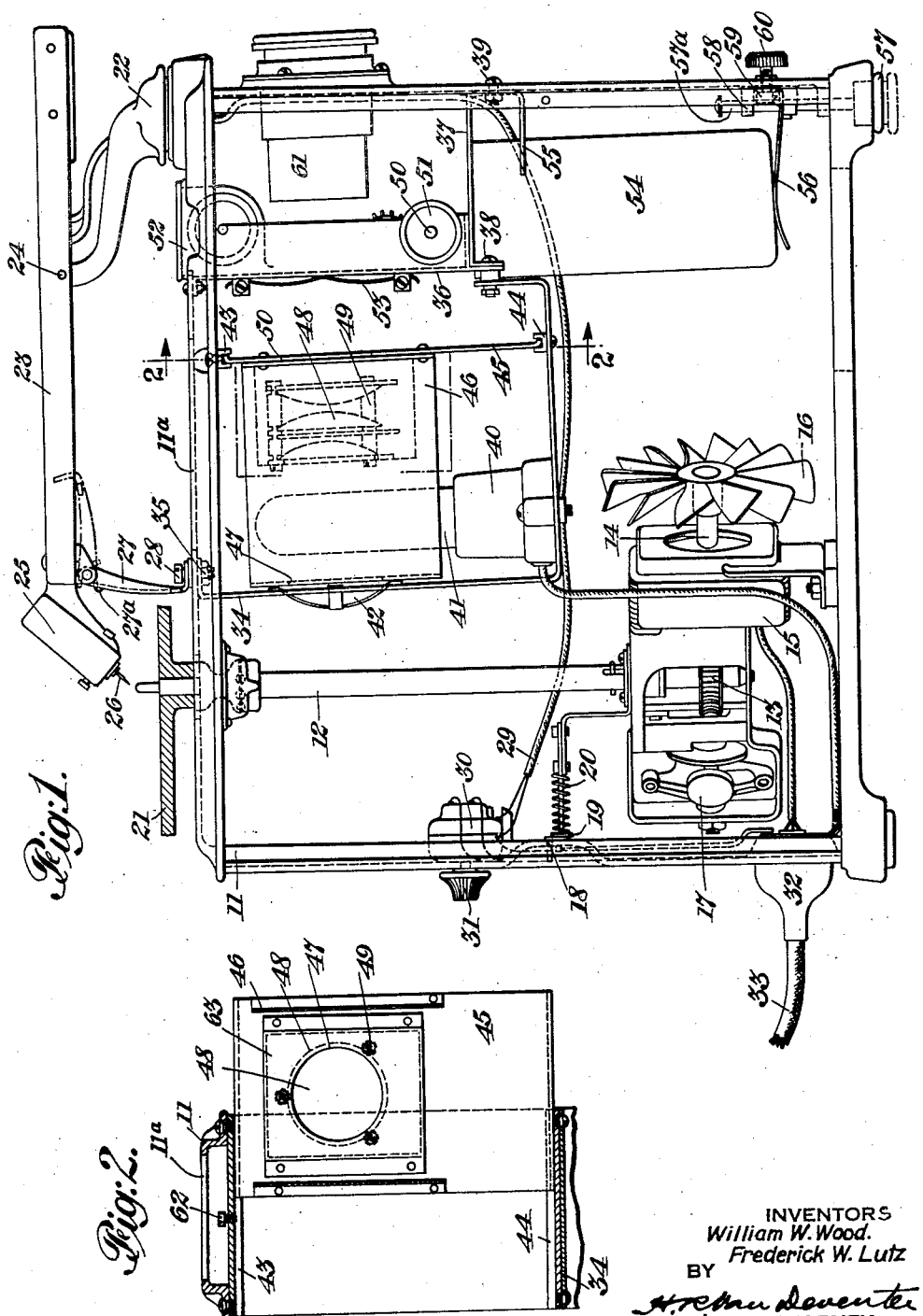

1,964,446

UNITED STATES PATENT OFFICE 1,964,446

COMBINATION PHONOGRAPH AND PICTURE PROJECTOR

William W. Wood, New York, and Frederick W. Lutz, Floral Park, N. Y., assignors to Visomatic Systems, Inc., a corporation of New York Application November 19, 1932, Serial No. 643,368

25 Claims. (Cl. 88—28)

This invention relates to improvements in combination phonograph and picture projectors. An object of the invention is to provide an improved combination phonograph and projecting machine by which a series of photographic views can be accompanied and explained by a corresponding phonographic reproduction, or vice versa.

A further object is the combination of the above apparatus in compact and convenient form, easily transportable as a unit.

A further object is the provision of means by which the phonograph record table can be kept level while the projecting system is inclined at an angle thereto.

A further object is the provision of improved means by which the loading, unloading and changing of films can be effected quickly and with a minimum of required skill.

A further object is the provision of means by which certain internal parts can readily be removed and replaced.

A further object is the provision of improved means for effecting the correct registry of the views on the film.

Other objects will appear from the following description where by way of illustration one embodiment of the invention is described.

The invention consists substantially in the construction, combination, location and relative arrangement of parts, all as will be more fully hereinafter set forth, as shown in the accompanying drawings and finally pointed out in the appended claims.

In the accompanying drawings:

Figure 1 is an assembly view of a combination phonograph and projector embodying the invention;

Figure 2 is a vertical cross sectional view on the line 2—2 of Figure 1, showing the removable condensing lens system;

Figure 3 is a perspective view of the removable gate unit used in the machine, Figure 1;

Figure 4 is a side elevation of the removable gate unit shown in Figure 3;

Figure 5 is a second side elevation of the gate unit, Figure 3, viewed from the reverse direction of Figure 4;

Figure 6 is a lateral cross section of the film magazine used in the gate unit, Figure 3, showing the fastening of the film therein by an end clip;

Figure 7 is a perspective view of the end clip, Figure 6, mounted on the end of a film;

Figure 8 is a perspective view of the removable film can used in the machine, Figure 1;

Figure 9 is a side elevation in partial section, illustrating a modification in the machine, Figure 1, in which the angle of projection is adjustable with respect to the plane of the phonograph record; and Figure 10 illustrates the coacting devices carried by the film and gate for predetermining the initial or starting position of the film when beginning a projection.

Referring to Figure 1, the numeral 11 denotes an outer main frame or body from which the side plates (not shown) have been removed. This constitutes a casing for the phonograph and picture projector.

The phonograph includes a vertical shaft 12 suitably journalled in 11 and driven in the usual manner through a worm wheel 13 by a worm (not shown) on shaft 14 of electric motor 15. Shaft 14 carries in addition to the worm a ventilating fan 16 and a centrifugal speed governor 17 of known type. Speed-adjusting lever 18 protrudes outwardly through a slot in a depressed portion of the case 11 and is held in adjustment by two fiber friction strips 19, urged into frictional contact with the case by a compressed spring 20.

The numeral 21 denotes a phonograph record platen or turntable adapted to be removably mounted on the upper end of shaft 12. 22 denotes a bracket rotatably mounted on the frame 11 and supporting the arm 23 on the horizontal pivot 24. 25 denotes a magnetic pick-up head or reproducer in which needle 26 is removably fastened and adapted to cooperate with a record on platen 21 in the usual manner. A pivoted arm 27, urged in a counter-clockwise direction about its pivot by spring 27a, is forked at its lower end so as to engage shouldered screw 28 when platen 21 is removed. Arm 27 when the apparatus is in use, is swung upward by spring 27a into the position shown in dot and dash lines.

While a magnetic pick-up is shown and described by way of illustration, it will be understood that any suitable form of reproducer can be used.

Wires 29 connected to the reproducer 25, are carried through arm 23, bracket 22 and case 11 to a volume control or rheostat 30, provided with an adjusting knob 31. A removable plug connector 32 provides all electrical connections for the pick-up, phonograph motor and the lamp for the projector through cable 33 to an exterior amplifier and loud speaker, and current supply respectively, although these parts if required may be enclosed within the casing 11. As the circuits of and connections to the amplifier, speaker and current supply may be of any suitable character such as those shown and described in application Serial No. 642,394 filed November 12, 1932 they are not here described in detail.

The numeral 34 denotes a frame, preferably formed of sheet metal and bolted to case 11 at 35. 36 denotes a second frame, also fastened to 11 at the top. 37 denotes a third frame, bolted to the front of frame 11 at 39. Frames 34, 36 and 37 are fastened together in mutually supporting relation by screws 38.

A lamp socket 40, holding lamp 41 constituting the light source for the projector, is fastened to frame 34, and a concave reflector 42 is also attached to 34 so as to cooperate with lamp 41.

Channel members 43 and 44 are fastened to 11 and 34 respectively, slidably supporting the panel 45. A substantially U-shaped member 46 has its feet riveted to panel 45 and forms therewith a box, open at top and bottom, surrounding lamp 41 and a condensing lens system 48. The lens members of system 48 are held in spaced relation by grooved cylinders 49, the assembly being supported by panel 50 as shown in Figure 2. A hole 47 is provided in the side of the U-shaped member 46 to register with reflector 42, as shown in Figure 1, and a hole 50 in 45 allows passage of light from the condensing lens system outwardly through the film in the film gate assembly shown in Figure 3 and the lens 61.

Referring to Figure 2, panel 45 is shown partly removed from the projector. In addition to the parts already described, 62 denotes a screw in frame 11 by which panel 45 can be locked in normal position, and 63 denotes an inner box, riveted to 45, in which the condensing lens system 48 is supported on grooved spacing cylinders 49.

The numeral 50, Figure 1, denotes a horizontal shaft journalled in frame 36, and carrying a knob 51. 52 denotes a gate body member or sub-frame for a unit assembly in and on which the entire film magazine, registering apparatus and means for moving a film through the gate is mounted to form an assembly removable from the projector as a unit. Leaf springs 53 mounted on main frame 11, hold the unit in operating position.

Referring to Figure 3, which shows the gate unit assembly removed from the projector or frame as already noted, the numeral 64 denotes a cylindrical magazine holder, under spring tension, that will tend to hold a film wound thereon. The mechanism of such a holder is part of the subject matter of a previous application, Serial Number 619,288, filed June 25, 1932. The numeral 65 denotes a screw holding the end of 64 in place.

Referring to Figure 6, 88 denotes a film threaded into a magazine 81. The numeral 89 denotes a clip fastened to the inner end of the film 88 to engage a lip 90 of the winding cylinder 64.

Referring to Figure 7, 91 denotes tabs or extensions formed on one end of the clip 89, bent through film holes and locked as shown, this fastening the clip 89 to the film 88.

In Figure 3, the numeral 66 denotes slide rails formed on the sides of 52, the space between the rails being spanned by an integral web 67. The numeral 69 denotes a horizontal shaft journalled in lugs formed on body 52. On shaft 69 are rigidly mounted a gear 70, a sprocket member 71 and a spacer cam 72. The numeral 73 denotes a spring actuated lever adapted to cooperate with spacer cam 72.

In Figure 5, the lever 73 is shown pivoted to 52 on a pin 84. A plunger 85, sliding in a boss 87, is pressed against the lever 73 by a spring 86, holding the lever 73 in contact with the cam 72.

Referring to Figure 3, the numeral 68 denotes a glass panel. Leaf springs 74 are arranged to press a frame 75 and the glass panel 68 through a gate opening in the body 52.

Referring to Figure 5, the numeral 83 denotes a clip by means of which the glass panel 68 is fastened to the frame 75. The numeral 82 denotes pins fixed in the body 52 and retaining springs which press the frame 75, the clip 83 and the glass 68 to the right.

Referring to Figure 4, the gate assembly and related structures are viewed from the side on which the gear 70 is mounted, certain parts being omitted to avoid complicating the view. A pair of guide rails 76 are arranged to engage the slide rails 66. Lugs 77, formed on the guide rails 76, project through slots in the frame 36. Leaf springs 53, flexed between the frame 36 and screws 78 in the lugs 77, urge guide rails 76 toward frame 36, thus placing slide rails 66 in compressive friction between the guides 76 and frame 36. The numeral 79 denotes ridges formed on the backs of the rails 66, these ridges being adapted to drop into slots 80 in the frame 36.

Referring to Figure 1, the numeral 54 denotes a film receptacle, open at the top and normally positioned laterally by a forked extension 55 of the frame 37. The receptacle 54 is normally urged upward against the frame 37 by a leaf spring 56.

Referring to Figure 8, the numeral 92 denotes a lug formed on the case 11, 92a denoting a screw holding the spring 56 in swivel engagement with 92. The numeral 93 denotes a slot through the frame 37 through which film is fed into the receptacle 54. The numeral 94 denotes a curved lip on the edge of the slot 93 for guiding the film into and out of 54.

In Figure 1, padded feet 57 are attached to the bottom of plungers 57a, which latter are adjustable vertically through lugs 58 formed inside the frame 11. A bar 59 is pressed against the plungers 57a by a screw 60, locking the plungers at any desired point of adjustment.

In Figure 9, the numeral 95 denotes a subframe from which the entire projecting system is suspended, the said frame being swung on a horizontal pivot 97 through lugs 96. The numeral 98 denotes an upward extension of the sub-frame 95, designed to receive gate body 52. The numeral 99 denotes a forward extension of 95 designed to hold the lens-barrel 61. The numeral 100 denotes an opening in main case 101 through which extension 99 protrudes. The numeral 102 denotes a second opening in 101 through which extension 98 protrudes. The numeral 103 denotes a frame member performing the same function as 37 in Figure 1, but having its right hand portion bent in a semi-circular arc as shown. The numeral 104 denotes a brace provided to stiffen the sub-assembly. The numeral 105 denotes a segmental strip, tapped to act as a nut on adjusting screw 106. The numeral 107 denotes a compression spring mounted on 106 between 103 and 101. The numeral 108 denotes a plano-convex washer or collar adapted to allow screw 106 to swing to different angles in passing through casing 101. The numeral 109 denotes a bracket supporting spring 110 for holding receptacle 54 in place.

Referring to Figure 10, the numeral 111 denotes a film hooked or threaded in starting position. The numerals 112 and 112a denote pins fixed in the body 52 to engage a clip 113 which is clamped on the end of the film 111. The numerals 114 denote an opening in the body 52 through which the teeth 115 of the sprocket member 71 project in order to engage perforations 116 of the film 111.

By placing suitable indicia such as the word "start" or an "X" as shown in Figure 10, on the first frame of the film 111, the distance "Y", Figure 10, which is the distance between the clip or tab 113 hooked on the pins 112, 112a, and the center of the "X" is indefinitely defined, so that the film is always correctly positioned in respect to the aperture in the film gate, and the latter always bears a fixed relationship to the indicia on the film which is correctly positioned for starting by means of the tab 113.

The operation of the device is as follows: The unit is lifted from its carrying case, arm 23, Figure 1, being used as a handle in combination with bracket 22 and pivoted arm 27 in the position shown. The unit is placed on a table or other suitable surface. Pivoted arm 23 is drawn to the left, releasing its forked foot from screw 28, arm 23 and bracket 22 are swung to the side and pivoted arm 27 allowed to snap into retracted position as shown by dot and dash lines. Record table 21 is placed on shaft 12 as shown, and if necessary, levelled by a shim under the back feet and the adjustment of front feet 57.

Connections to the loud speaker and current supply are made by plugging in 32 and light 41 is turned on. The gate unit containing the film is dropped into place and the initial image brought into correct focus on the screen in the usual manner. The phonograph is started and the recorded production given, the operator changing the film images by single frames by turning knob 51 in correspondence with signals or indicating points on the record, which signals or indications may be made in accordance with the method described in application Serial No. 642,394 filed November 12, 1932.

The film 111 having been drawn out against the tension of the spring reel 64, the clip 113 is hooked over the pins 112 and 112a, the teeth 115 of the sprocket 71 at the same time entering the perforations 116 of the film 111. The film is held taut by the reel 64. The entire unit is now ready to be dropped into the projector, the film 111 being automatically spaced for starting in synchronism with the phonograph, or if picture projection only is desired, by the above procedure the first picture or "frame" is automatically located ready for projection.

Upon the completion of the performance the film is rewound into its magazine as described in the previous application Serial Number 619,288. Should the film accidentally become torn so as to prevent proper rewinding it can readily be removed as follows, referring to Figure 8:

As it unwinds the film is received in receptacle 54. In the event of the above accident, the side plate (not shown) is removed, spring 56 is swung to one side as shown by dotted lines, and receptacle 54 containing the film is dropped downward and withdrawn from the unit.

Figures 3, 4 and 5 show the removable gate unit which forms part of the subject matter of the previous application Serial Number 619,288, but with a number of improvements and additions thereto. In the present structure, shaft 69, carrying gear 70, sprocket member 71, and cam 72, is journalled directly to body member 52 and is removable with it as a unit. Thus when the film is threaded through the gate unit (as more fully described in the application just referred to) it is at the same time brought into mesh with the sprockets, the entire operation being accomplished before the unit is placed in the projector. As the assembly is pushed downward into the case 11, the rails 66, riding on ridges 79, are pressed between frame 36 and spring urged guides 76. When operating position is reached ridges 79 drop into slots 80 as shown by dotted lines, Figure 4, firmly locking the unit in position, and at the same time gear 70 drops into mesh with mating gear 50a on knob shaft 50. By turning knob 51, Figure 1, the operator will cause sprockets 71 to revolve and move the film, the proper registry being maintained by cam 72 and cooperating arm 73. The glass panel 68, urged by springs 74, presses the film lightly against the opposite stationary gate opening, thus keeping the film flat and taut.

Figures 6 and 7 show the construction and application of the improved end clip for use in connection with the film magazine. The magazine having been loaded, a start to unwind the film draws clip 89 into engagement with hook or lip 90 on spring reel 64, revolving the latter and winding up a spring in the interior thereof, which spring and the construction of this reel 64 constitute a separate invention as disclosed in the pending application Serial Number 619,288 aforesaid.

Figure 2 shows the manner in which the entire condensing system 48 together with its housing, can readily be removed for cleaning or inspection. Platen 21 is first removed, the pick-up arm 23 having been swung to one side, and lamp 41 is removed through a ventilating hole 11a in the top of case 11. Lock screw 62 is loosened, and panel 45 together with box 46 and the entire condensing system can then be slid sidewise out of the projector.

In Figure 1, the projection system is shown inclined at an angle upward from the plane of the phonograph table. It must be understood that the construction is not limited to this exact inclination, and the apparatus can also be constructed to incline the axis of projection downward or to bring it parallel to the record plane without departing from the scope of the invention.

Figure 9 shows a modification in which the projecting angle is adjustable. In this embodiment the entire projecting system is mounted on a subframe 95, which is hinged to the main case 111 on pivot 97. The extension 98, receiving the gate unit and the extension 99 holding the projecting lens system protrude through openings 102 and 100 respectively, having sufficient clearance therewith to allow a considerable angular movement of the sub-assembly around pivot 97. The angular movement is controlled and adjusted by screw 106 cooperating with spring 107, segmental nut 105 and convex washer 108 being provided to allow the screw 106 to rock as the adjustment is changed. By the above construction it is possible to adjust the projection axis to any angle within its range while keeping the phonograph table level as required for proper reproduction.

Although the invention has been disclosed in connection with the specific details of preferred embodiments thereof, it must be understood that such details are not intended to be limitative of the invention except in so far as set forth in the accompanying claims.

What is claimed is:

1. A picture projector comprising an apertured main frame having supported thereon a projection lens and a lamp and mechanism for operating the projector, a unit assembly adapted to fit within said frame comprising a film holder, a film gate, and means for moving a film through said gate, said unit being removable from said frame while said lens, lamp and mechanism remain in place.

2. A picture projector comprising an apertured main frame having supported thereon a projection lens and a lamp and mechanism for actuating the projector, an assembly adapted to fit in the aperture in said main frame and comprising a sub-frame, a film magazine, a film gate, and film feeding mechanism, said assembly being removable while said lens, lamp and mechanism remain in place.

3. A picture projector having a main frame, a sub-frame within said main frame and slidably removable therefrom and carrying a condensing lens system, and a second sub-frame slidably removable from said main frame carrying a film magazine, a film gate, and film feeding mechanism.

4. In combination in a film projection apparatus, a film, a self-contained unit comprising a gate adapted to extend into said apparatus, coacting devices carried by said film and gate for predetermining the initial position of said film thereon, a film reel, an interchangeable film container carried by said gate, and means on said gate for moving said film therethrough.

5. In combination in a film projection apparatus, a self-contained unit comprising a gate adapted to extend into said unit, coacting devices carried by said film and gate for predetermining the initial position of said film thereon, a film reel, an interchangeable film container carried by said gate, film feeding means on said gate including a gear, and a gear fixed in and supported by said projection apparatus adapted to mesh with said first gear when said unit is in place.

6. In combination in a film projection apparatus comprising an apertured main frame having supported thereon a projection lens and a lamp and mechanism for operating the projector, a self-contained unit comprising a gate adapted to extend into said apparatus, a film carried on said gate, and means on said gate for engaging said film and moving the same therethrough, said last means adapted to cooperate with said first means when the gate is in place in the projection apparatus, while said lens, lamp and mechanism remain in place.

7. In a picture projector comprising an apertured main frame having supported thereon a projection lens and a lamp and mechanism for operating the projector, an assembly comprising a film magazine holder, a supporting frame therefor having portions adapted to engage the frame of the projector and thereby definitely position said unit therein, a film gate and mechanism for positioning a film therein mounted on said frame, and means for moving a film through said gate secured to said frame and removable therewith from said picture projector as a unit, while said lens, lamp and mechanism remain in place.

8. In a picture projector, a film feeding mechanism comprising a supporting frame, a film magazine holder thereon, a gate mechanism supported on said frame, and means for moving a film through said gate, said means including a shaft, a sprocket member secured thereto, a spacer cam secured to the shaft, and a spring actuated arm adapted to cooperate with said spacer cam, all said mechanism constituting an assembly removable from said projector as a unit.

9. In a picture projector, a frame having slide rails, a transparent panel mounted between said rails, a horizontal shaft mounted on said frame, sprockets mounted on said shaft, and a film mounted on said frame and adapted to be unreeled by said sprockets, all of the foregoing adapted to be removed and replaced in said projector as a unit.

10. In a motion picture projector, the combination of a frame for the projector having an opening therein and a unit assembly removably positioned in said opening, said assembly comprising a magazine holder for a picture film, a film gate mechanism for holding a film in position on said gate unit, means for moving a film through said gate mechanism, a film in said gate unit, and means partly on said film and partly on said gate unit whereby the film may be definitely positioned when starting the film through said mechanism.

11. In a picture projector, the combination with the frame of the projector of a winding cylinder, a film having a metal clip thereon adapted to engage said winding cylinder, a metal tab secured to the outer end of said film, and an aperture in said frame having a fixed relationship to indicia on said film when the end of same is definitely positioned on said frame by means of said tab.

12. In a picture projector, a supporting frame having clip engaging means thereon constituting a film gate, a cylinder on said frame, and a film having a clip secured to its inner end adapted to engage said cylinder and a clip secured to its outer end adapted to engage said clip engaging means to definitely locate said film in respect to said film gate.

13. In a motion picture projector, a frame, a rotatable cylinder having a projection thereon, a film having a metal clip secured to its inner end adapted to engage said projection and a clip secured to the outer end of said film and adapted to engage said frame whereby said film may be definitely positioned for starting in respect to the optical system of the projector.

14. In a picture projector, a casing, film feeding mechanism therein, a film can having an open top positioned below said mechanism, means on said casing for securing said can in place thereon, including a substantially U-shaped member secured to said frame and having outwardly extending lugs adapted to laterally embrace said can and having a slotted top portion adapted to cover the open end of said can, and means supported on said frame adapted to press said can upwardly against said U-shaped member whereby the can is removably positioned in the projector.

15. In a film projection apparatus, a rectangular casing having an aperture in its top, a self-contained unit comprising a gate adapted to extend into said casing through the aperture therein said gate having thereon a film reel, a film and feeding mechanism for the film, and a receptacle removably positioned below said gate and within said casing and adapted to receive film unwound from said reel.

16. In a film projection apparatus, a casing having an aperture in its top, a self-contained unit comprising a gate adapted to extend into said casing through the aperture therein, said gate having thereon a spring tensioned reel, a film wound on said reel, feeding mechanism for film mounted on said gate, and a receptacle removably positioned below said gate and within said casing and adapted to receive film unwound from said reel.

17. In a picture projector a casing, a projecting lens and a film gate supported thereby, a framework slidably supported therein, and a condensing lens system supported on said framework and removable therewith as a unit, while said lens and film gate remain in place in said casing.

18. In a film projection apparatus, a casing having an aperture in its top, a self-contained unit comprising a gate adapted to extend into said casing through the aperture therein, said gate having thereon a film and feeding mechanism therefor, a framework slidably supported in said casing behind said gate, and a condensing lens system supported on said framework and removable therewith as a unit.

19. In a picture projector the combination of a casing, a phonograph record table mounted in a fixed plane thereon, a picture projector mechanism including a source of light, a projecting lens, means for moving a picture film between said light and lens, and horizontal pivot means mounted in said casing, all said projector mechanism being movably mounted upon said pivot means whereby the angle of projection may be adjusted with respect to the plane of said record table.

20. The combination as claimed in claim 19 in which a sub-frame mounted on said pivot means within said casing supports the entire projection apparatus.

21. In a device for projecting pictures, a casing, a self contained unit removably mounted in said casing, said unit including a film, a film gate, and feeding mechanism for the film; an open ended film can removably positioned beneath and in operative relation to said unit for receiving said film, a lamp house including a condensing lens, an objective lens, a motor for driving said mechanism, and a fan in direct line with and adapted to cool said can.

22. In combination, a phonograph comprising a motor and a record turntable driven thereby, a frame enclosing said motor, a governor for the said motor, means projecting outwardly through said frame for adjusting said governor, a fan driven by said motor, a picture projector mounted within said frame and having a receptacle for film positioned within the air stream from said fan and adapted to be cooled thereby, and means for vertically adjusting the emergent beam from said projector in relation to the plane surface of said turntable.

23. In a combination phonograph and picture projector, a main frame forming a casing, phonograph mechanism mounted thereon including a motor within said casing, a sub-frame having a portion adapted to fit within said casing and supporting film holding and film feeding mechanism within said casing adapted to cooperate with means outside said casing for actuating said feeding mechanism, said sub-frame and its associated parts being removable from said main frame as a unit.

24. In a combination phonograph and picture projector, a main frame forming a casing, phonograph mechanism mounted thereon including a motor within said casing, a sub-frame within said casing and slidably removable from the side thereof, said frame having thereon a condensing lens system for the projector, a lamp for the projector within said main casing, and a sub-frame having a portion fitting into the top of said main frame, said sub-frame having thereon film holding and feeding mechanism removable therewith from the projector as a unit.

25. In a combined phonograph and film projection apparatus, a rectangular casing having an aperture in its top, a projection lens in the front of said casing, a self-contained unit comprising a gate adapted to extend into said casing through the aperture therein, said gate having thereon a film and feeding mechanism therefor, a rotatable shaft within said casing and a gear on said shaft adapted to engage and operate said film feeding mechanism when said unit is in place, a condensing lens, a panel supporting said lens withdrawable from the side of said casing, a lamp in said casing, a phonograph motor in said casing having a shaft projecting from the top thereof, a record turntable removably mounted on the projecting end of said shaft, a swinging reproducing arm mounted on the top of said casing, a reproducer carried by said arm, and a fan driven by said phonograph motor and adapted to cool parts enclosed by said casing.

WILLIAM W. WOOD.
FREDERICK W. LUTZ.